United States Patent
Matsushita et al.

(10) Patent No.: US 9,052,504 B2
(45) Date of Patent: Jun. 9, 2015

(54) HEAD-UP DISPLAY

(71) Applicant: YAZAKI CORPORATION, Tokyo (JP)

(72) Inventors: Junichi Matsushita, Shizuoka (JP); Kunimitsu Aoki, Shizuoka (JP); Tetsuya Sugiyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/796,971

(22) Filed: Mar. 12, 2013

(65) Prior Publication Data

US 2013/0188260 A1 Jul. 25, 2013

Related U.S. Application Data

(63) Continuation of application No. PCT/JP2011/070647, filed on Sep. 9, 2011.

(30) Foreign Application Priority Data

Sep. 13, 2010 (JP) .................................. 2010-204687

(51) Int. Cl.
- *G02B 27/14* (2006.01)
- *G02B 1/10* (2006.01)

(Continued)

(52) U.S. Cl.
CPC ................ *G02B 27/01* (2013.01); *B60K 35/00* (2013.01); *B60K 2350/2052* (2013.01); *B60K 2350/941* (2013.01); *G02B 27/0101* (2013.01); *G02B 2027/0121* (2013.01); *B60K 2350/405* (2013.01)

(58) Field of Classification Search
USPC ........................... 359/630–632, 583, 618, 640
See application file for complete search history.

(56) References Cited

U.S. PATENT DOCUMENTS

| | | | |
|---|---|---|---|
| 5,013,134 A | * | 5/1991 | Smith ........................... 359/630 |
| 5,504,622 A | * | 4/1996 | Oikawa et al. ................ 359/630 |
| 5,812,332 A | | 9/1998 | Freeman |

(Continued)

FOREIGN PATENT DOCUMENTS

| | | |
|---|---|---|
| JP | 3-209210 A | 9/1991 |
| JP | 7-195959 A | 8/1995 |

(Continued)

OTHER PUBLICATIONS

International Search Report for PCT/JP2011/070647 dated Dec. 13, 2011.

(Continued)

*Primary Examiner* — Scott J Sugarman
*Assistant Examiner* — Mustak Choudhury
(74) *Attorney, Agent, or Firm* — Kenealy Vaidya LLP (57) ABSTRACT

A head-up display includes a display device and a combiner that has a rear surface brought into contact with an inner surface of a windshield of a vehicle, and reflects a display light rays emitted from the display device by a front surface of the combiner toward a driver in the vehicle. The front surface forms a first arc-shaped optical surface which receives and reflects the display light rays toward the driver so that the driver sees a first virtual image of the display light rays with a set magnification greater than 1 on the outside of the windshield. The rear surface forms a second arc-shaped optical surface which receives and reflects the display light ray toward the driver so that the driver sees a second virtual image which coincides with the first virtual image in terms of the size and position on an outside of the windshield.

11 Claims, 5 Drawing Sheets

(51) Int. Cl.
  *G02B 27/01*   (2006.01)
  *B60K 35/00*   (2006.01)

(56) References Cited

U.S. PATENT DOCUMENTS

| | | | | |
|---|---|---|---|---|
| 5,886,823 | A * | 3/1999 | Sugano | 359/630 |
| 6,359,737 | B1 * | 3/2002 | Stringfellow | 359/631 |
| 2004/0183750 | A1 | 9/2004 | Nagano et al. | |
| 2010/0314900 | A1 | 12/2010 | Labrot et al. | |

FOREIGN PATENT DOCUMENTS

| | | |
|---|---|---|
| JP | 2003-39983 A | 2/2003 |
| JP | 2005-156678 A | 6/2005 |
| WO | 2009/071135 A1 | 6/2009 |

OTHER PUBLICATIONS

Japanese Office Action for the related Japanese Patent Application No. 2010-204687 dated Jul. 24, 2014.

Japanese Office Action for the related Japanese Patent Application No. 2010-204687 dated Mar. 3, 2015.

* cited by examiner

HEAD-UP DISPLAY

BACKGROUND

The present invention is related to a head-up display having a combiner which reflects light rays emitted from a display device toward a driver.

Figure 7:
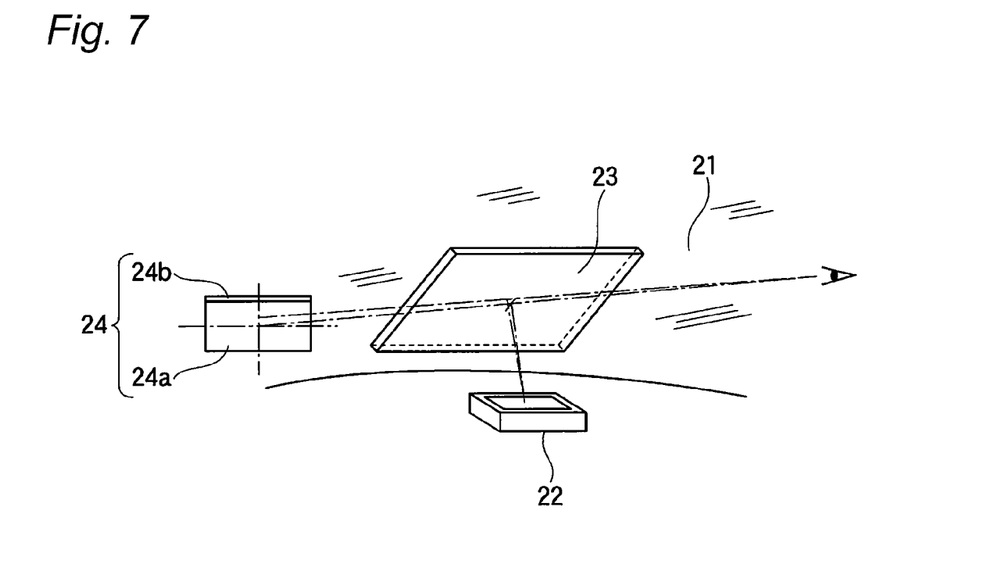
FIG. 7 is a schematic diagram showing a conventional head-up display.

Various head-up displays have been proposed to allow a driver of a vehicle to see various kinds of driving information (for example, see Patent Document 1). For example, as shown in FIG. 7, the head-up displays reflect display light rays (display image) emitted from a display device 22 installed in a lower part of a windshield 21 toward a driver by a thin plate-shaped combiner 23 (a reflection member) formed on a surface of the windshield 21. Accordingly, the driver is allowed to be able to recognize display light rays 24 (display image) which forms a virtual image overlapping a scene in front of the windshield through the windshield.

According to the head-up display, the driver can significantly reduce the number of movements of line of sight, that have been conventionally performed, which is occurred by alternately and repeatedly looking at the displays of various meters embedded in a front surface of an instrument panel and looking at scenes and traffic situations ahead through the windshield. That is, it is possible to visually confirm and recognize on the windshield the displays of the various meters together with the scenes and traffic situations ahead through the windshield, without moving the line of sight and changing the focus of eyes significantly. Therefore, it is possible to secure steering stability of the vehicle.

Figure 8:
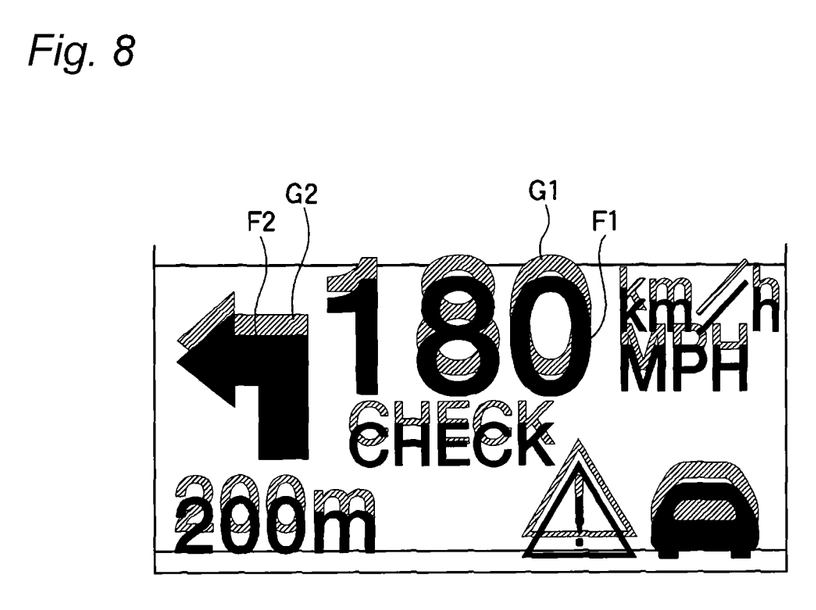
FIG. 8 is an explanatory diagram showing a display image which is seen by a conventional head-up display.

However, when the display image is allowed to be formed and seen as a virtual image on the outside of the windshield, the driver sees a double image in which a position deviation occurs between display images 24a and 24b due to an optical path difference of the reflected light rays which are reflected by an inner surface (front surface) and an outer surface (rear surface) of the combiner. As a result, it is not possible to clearly see displayed information such as a vehicle speed and a direction signal, and there are inconveniences such as a mistake in reading of the displayed information and taking a long time to accurately read the displayed information. FIG. 8 shows the case in which display light rays (ghost image) G1 and G2 positionally deviated with respect to normal display light rays (display image) F1 and F2 for the display of a vehicle speed and the display of a direction signal (display of a left turn signal) on a display device 12 are seen. Meanwhile, in order to prevent the occurrence of such a double image, a method is considered which includes forming an AR coating (antireflection film) on a rear surface of a combiner 23 and suppressing reflected light rays (reflected image) from the rear surface of the combiner 23 to more clearly see reflected light rays from a front surface of the combiner than the reflected light rays from the rear surface. However, this method is not practical because an antireflection film treatment is required to be performed on the combiner 23 and this leads to an increase in the total cost of the head-up display.

With respect to this, a head-up display is proposed in which a front glass having a three-layer structure which functions as a combiner is used to allow display images which are reflected by an inner surface and an outer surface of the front glass and reach an observer to overlap each other to thereby form a single image (for example, see Patent Document 2). In the head-up display, principal surfaces on both sides of the front glass are not parallel to each other in a selected area. The information display entering the non-parallel principal surface of the front glass is configured so that directions of light rays which are reflected by the inner surface and light rays which approach the glass and are reflected by the outer surface are emitted from the inner surface are determined along the same line in a range of a driver's eyes. Accordingly, it is possible to reduce the frequency of the formation of a double image which is formed when the laminated front glass is used as a combiner of the display device.

[Patent Document 1] JP-A-2003-039983
[Patent Document 2] JP-A-07-195959

SUMMARY

It is therefore one advantageous aspect of the present invention to provide a head-up display which prevents virtual images of display images, which are seen by being reflected by a front surface and a rear surface of a combiner, from forming a dual image to clearly see the display image, and can be configured and used at a low cost by simply attaching the combiner to a general front glass.

According to one advantage of the invention, there is provided a head-up display comprising:

a display device that emits display light rays; and a combiner that has a rear surface brought into contact with an inner surface of a windshield of a vehicle, and reflects the display light rays emitted from the display device by a front surface of the combiner toward a driver in the vehicle, wherein the front surface of the combiner forms a first arc-shaped optical surface which receives and reflects the display light rays emitted from the display device toward the driver so that the driver sees a first virtual image of the display light rays with a set magnification greater than 1 on the outside of the windshield, and the rear surface forms a second arc-shaped optical surface which receives and reflects the display light rays emitted from the display device toward the driver so that the driver sees a second virtual image which coincides with the first virtual image in terms of the size and position on an outside of the windshield.

The first optical surface and the second optical surface may be arc-shaped optical surfaces so that the second virtual image is seen to be positioned behind the first virtual image.

The head-up display may be configured such that a curvature of the second optical surface of the combiner is greater than a curvature of the first optical surface of the combiner.

The head-up display may be configured such that a thickness of the combiner becomes thinner from one end to the other end.

According to another advantage of the invention, there is provided a head-up display comprising:

a display device that emits display light rays; and a combiner that has a rear surface brought into contact with an inner surface of a windshield of a vehicle, and reflects the display light rays emitted from the display device by a front surface of the combiner toward a driver in the vehicle, wherein the combiner has a cross-section formed into a wedge shape, and a thickness of the cross-section continuously becomes thinner from one end to the other end.

According to another advantage of the invention, there is provided a head-up display comprising:

a display device that emits display light rays; and a combiner that is disposed separately from an inner surface of a windshield of a vehicle, and reflects the display light rays emitted from the display device by a front surface of the combiner toward a driver in the vehicle, wherein the front surface of the combiner forms a first arc-shaped optical surface to receive and reflect the display light rays emitted from the display device toward the driver so that the driver sees a first virtual image of the display light rays with a set magnification greater than 1 on an outside of the windshield, and the rear surface of the combiner forms a second arc-shaped optical surface to receive and reflect the display light rays emitted from the display device toward the driver so that the driver sees a second virtual image which coincides with the first virtual image in terms of the size and position on the outside of the windshield.

BRIEF DESCRIPTION OF DRAWINGS

FIGS. 5A and 5B are cross-sectional views of the combiner shown in FIG. 4.

DETAILED DESCRIPTION OF EXEMPLIFIED EMBODIMENTS

The above-described head-up display disclosed in Patent Document 2 has the following problems to be solved. That is, in order to realize the head-up display, the front glass itself employs a three-layer structure in which an intermediate layer, of which the thickness from the top to the bottom varies into a tapered shape, is sandwiched between two sheets of glass. Therefore, since the head-up display becomes a special order product, the cost increases and there is an inconvenience in which the head-up display cannot be employed in vehicles having a general front glass.

It is therefore one advantageous aspect of the present invention to provide a head-up display which prevents virtual images of display images, which are seen by being reflected by a front surface and a rear surface of a combiner, from forming a dual image to clearly see the display image, and can be configured and used at a low cost by simply attaching the combiner to a general front glass.

Figure 1:
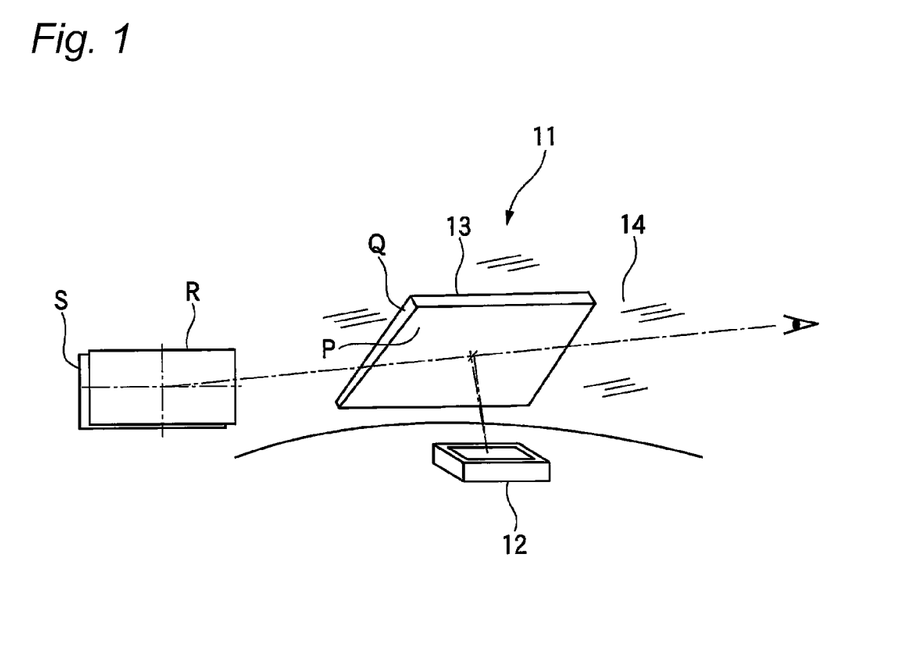
FIG. 1 is a schematic diagram showing a head-up display according to a first embodiment of the invention.

Hereinafter, a head-up display according to a first embodiment of the invention will be described with reference to FIGS. 1 to 3. FIG. 1 is a schematic diagram showing a head-up display 11 of this embodiment. The head-up display 11 is configured to mainly have a display device 12 and a combiner 13.

Among them, as the display device 12, a cathode-ray tube (CRT) display device, a liquid crystal display (LCD), an electroluminescent (EL) display device, a fluorescent display device (for example, seven-segment display), or the like having a small size which can be installed on a dashboard is used. The display device 12 is installed on the dashboard, separately from various meters attached to an instrument panel on the driver's seat side of a vehicle. The display device 12 functions to display various kinds of information necessary for at least the running of a vehicle, such as an engine rotation speed, a vehicle speed, and a direction signal.

The display device 12 may be installed so that a display surface is upwardly embedded in a concave part formed on an upper surface of the dashboard. Due to the upward display surface, the display device 12 functions to reflect display light rays (display image) in a direction of a driver from a combiner 13, to be described later, which is affixed to a windshield. The driver can see the display light rays as a virtual image R which is formed on the outside of a windshield 14 simultaneously with a scene on the outside of the windshield. As a result, the driver does not need to frequently move and change the line of sight to the windshield 14 from the meters of the instrument panel, and thus display information is easily confirmed.

In addition, the display device 12 can arbitrarily adjust an emission direction (vertical direction and/or horizontal direction) of the display light rays in accordance with the size and the installation position of the combiner 13. Therefore, the driver and other passengers can securely receive and see the display image (display light rays) on the display device 12 which is reflected by the combiner 13 in their fields of view.

The combiner 13 is formed of a transparent synthetic resin such as a silicon resin material or an acrylic resin material having a polyethylene terephthalate (PET) film laminated on a front surface, and is directly adhered to the windshield 14 by a method such as sticking, or if necessary, adhered via a material which promotes adhesion to the windshield 14.

Figure 2:
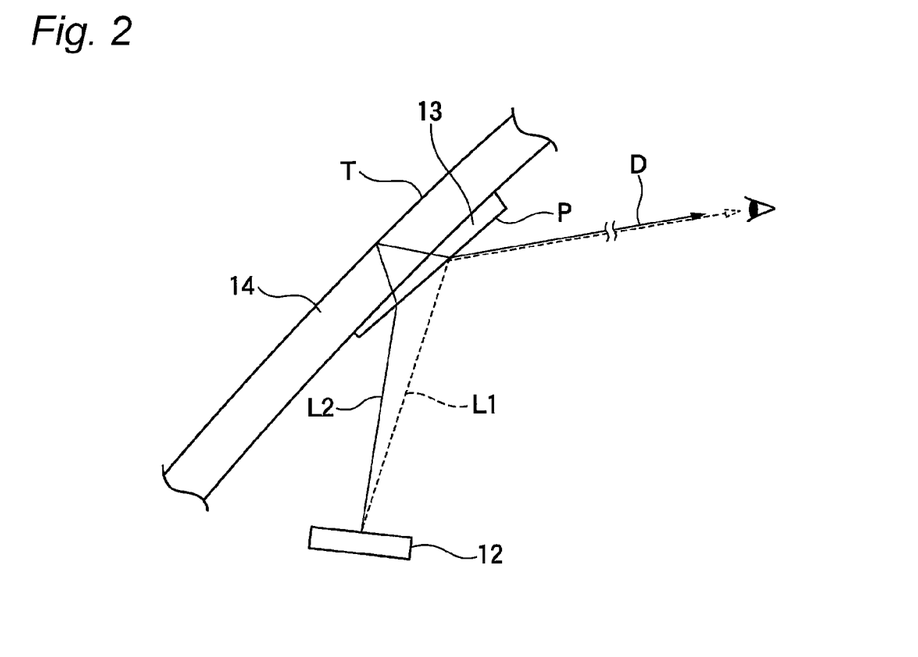
FIG. 2 is an explanatory diagram showing an action of avoiding the formation of a dual image by the combiner shown in FIG. 1.
Figure 3:
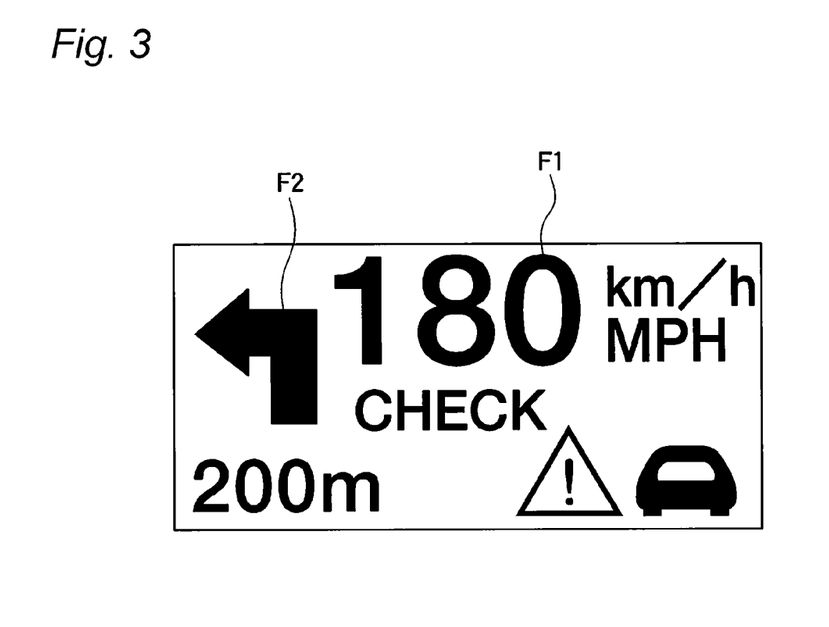
FIG. 3 is an explanatory diagram showing a display image which is seen by the head-up display of the invention.

In the head-up display 11 having such a configuration, the combiner 13 is formed into the above-described wedge shape and a predetermined thickness by an optical treatment so that display light rays L1 which are emitted from the display device 12 and reflected by a front surface P of the combiner 13 and display light rays L2 which are reflected by an outer surface T of the windshield overlap to be matched with each other and reach the eye point of the driver in the vehicle as shown in FIG. 2. In other words, a display image which is projected to the driver by the display light rays L1 reflected by the front surface P of the combiner 13 and a display image which is projected by the display light rays L2 reflected by the outer surface T of the windshield completely overlap each other, whereby a display image D which reaches the driver does not become a dual image. An example of the display image which is seen at this time is shown in FIG. 3. FIG. 3 shows the case in which the display of a vehicle speed and the display of a direction signal (display of a left turn signal) on the display device 12 are performed only with normal (ghosting does not occur) display light rays (display image) F1 and F2.

In addition, since the combiner 13 is formed to have a wedge-shaped cross-section and have a thickness which is continuously reduced from an upper end to a lower end, it can be mounted on many kinds of vehicles and the formation of the dual image can be avoided. The combiner 13 is a sheet-shaped product with a thickness varying as a whole, and can be simply affixed and fixed not only to the windshield, but also to various positions such as the dashboard and the sheet. In the above description, the case has been described in which the eye point is set around the driver. However, it is possible to dearly see various kinds of information in the vehicle by setting an angle which corresponds to a passenger of a passenger's seat and other passengers.

Next, a head-up display according to a second embodiment of the invention will be described with reference to FIG. 4, 5A, and 5B. Regarding constituent parts similar to those shown in FIGS. 1 and 3, overlapping descriptions thereof will be omitted.

Figure 4:
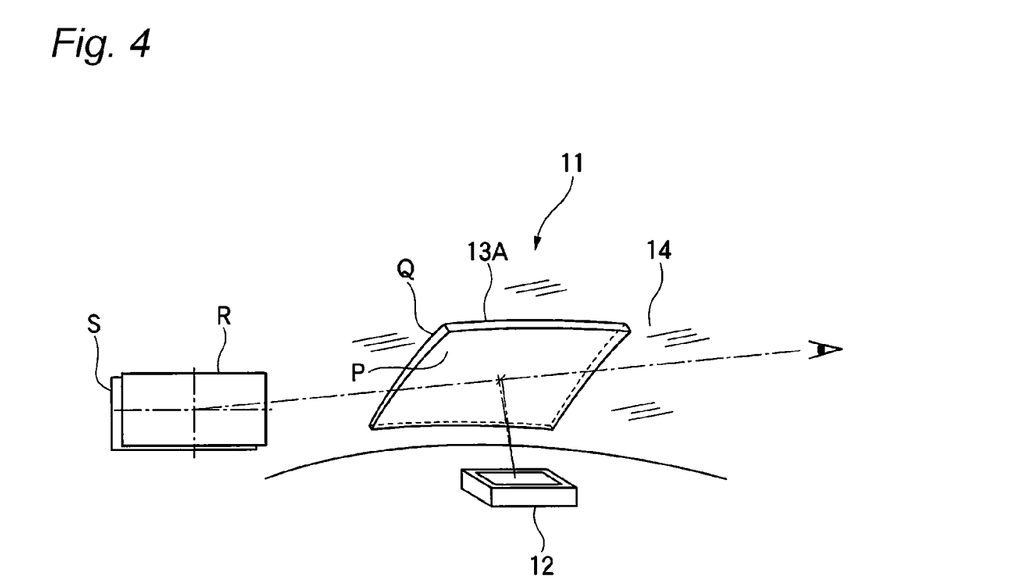
FIG. 4 is a schematic diagram showing a head-up display according to a second embodiment of the invention.

As shown in FIG. 4, a head-up display 11 of this second embodiment is configured to have a display device 12 and a combiner 13A. As shown in FIGS. 5A and 5B, the combiner 13A is formed so that both of a surface opposite to a windshield 14, i.e., a front surface P which forms a first optical surface and a surface which is brought into close contact with the windshield 14, i.e., a rear surface Q which forms a second optical surface form an arc-shaped curved surface in the horizontal direction and the vertical direction, and the curved surface is an aspheric surface. When the combiner 13A has an aspheric surface, it is possible to suppress the generation of an aberration.

Figure 5A:
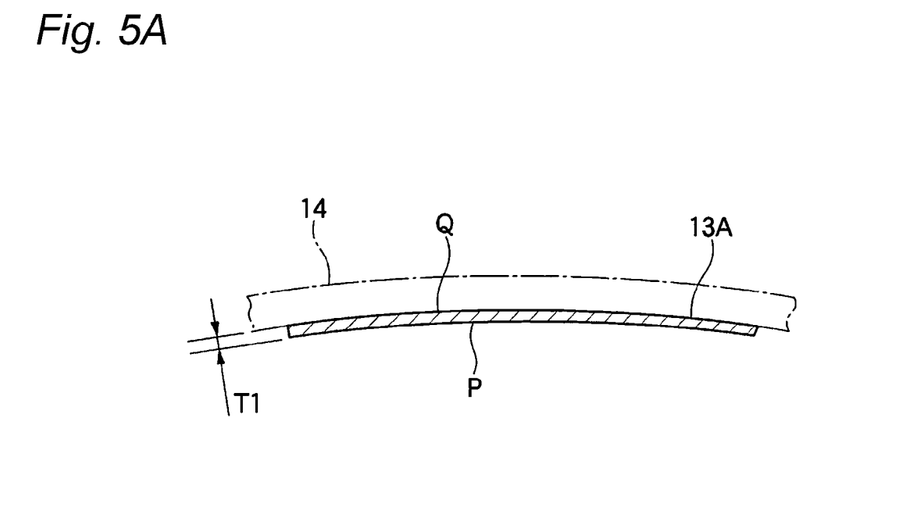
FIG. 5A is a transverse sectional view cut along the horizontal plane passing through the center of the combiner.
Figure 5B:
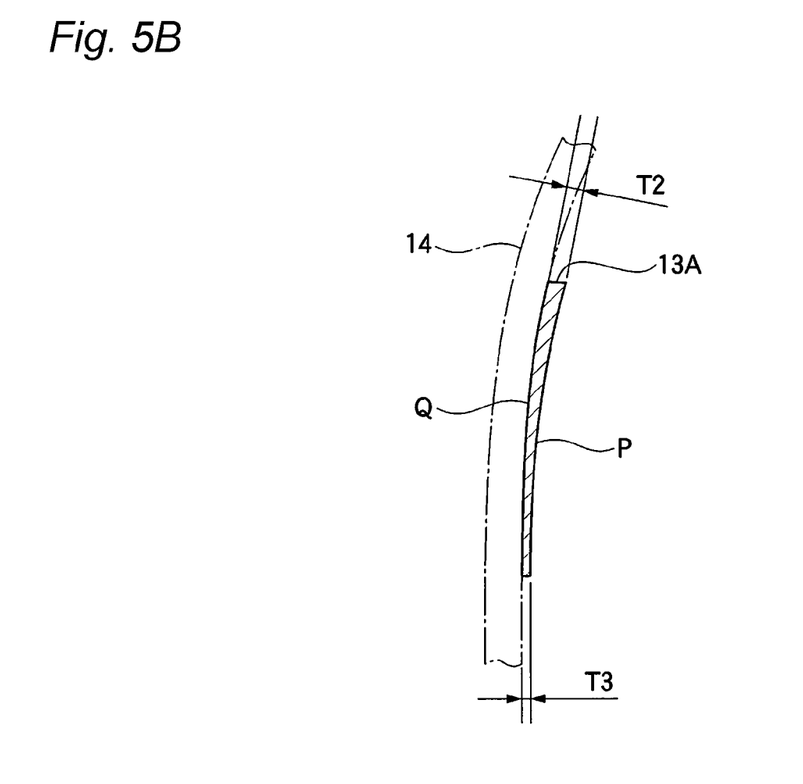
FIG. 5B is a longitudinal sectional view cut along the vertical plane passing through the center of the combiner.

As shown in FIG. 5A, the combiner 13A has a constant thickness T1 even when being cut along any horizontal plane. On the other hand, as shown in FIG. 5B, the combiner 13A has such a form that the thickness thereof gradually varies from a thickness T2 at an upper end to a thickness T3 at a lower end, even when being cut along any vertical plane.

In addition, the front surface P of the combiner 13A is formed into an optimized arc surface (curved surface) by a predetermined optical design so that the driver can see a virtual image which is formed on the outside of the windshield 14 with display light rays (display image) reflected from the front surface P to the driver with a set magnification greater than one. The rear surface Q of the combiner 13A is optically designed so that display light rays reflected by the rear surface Q coincide with the display light rays reflected by the front surface P of the combiner 13A in terms of the size and display position. Accordingly, it is possible to prevent a deviation (dual image) between the two display images resulting from a reflective optical path difference between the front surface and the rear surface of the combiner 13A.

The shapes of the front surface P and the rear surface Q of the combiner 13A can be designed as a polynomial aspheric surface or a free-form surface such as a Zernike polynomial surface in order to more precisely correct a distortion of the display image and set a display distance. In the combiner 13A, the aberration of the polynomial aspheric surface or the free-form surface by Zernike polynomials is controlled to alleviate and control the incidence angle of the light rays toward the driver (eyes), whereby it is possible to avoid a dual image from being formed by the reflective optical path difference.

In addition, by a design method similar to the design of the polynomial aspheric surface or the free-form surface such as a Zernike polynomial surface, display light rays (virtual image) reflected by the rear surface Q of the combiner 13A can be allowed to coincide with display light rays (virtual image) reflected by the front surface P at the same viewing angle, and the display image reflected by the combiner 13A can also be displayed slightly back. When the shape of the rear surface of the combiner 13A is designed as described above, it is possible to prevent the dual image from being formed and see a three-dimensional display image.

Furthermore, the combiner 13A has a substantially wedge shape so that the thickness thereof is gradually reduced (thinned) from one end (upper end) toward the other end (lower end), and a curvature of the rear surface Q is greater than a curvature of the front surface P. In FIGS. 5A and 5B, the thickness of the combiner 13A is reduced toward the right and left ends and the lower end, except for the upper end part of the combiner 13A. Accordingly, it is possible to improve injection moldability at the time of producing the combiner 13A and reduce the weight of the combiner 13A.

As described above, by virtue of a predetermined optical design, the combiner 13A of the second embodiment can allow a driver to see a virtual image of display light rays with a set magnification greater than one on the outside of the windshield 14. Accordingly, the driver can rapidly and securely grasp and confirm display information of the display light rays, and it is possible to avoid in advance a difficulty in seeing due to a position deviation between a plurality of display images which are reflected by the front surface and the rear surface of the combiner 13A. Meanwhile, when a second virtual image S of the display light rays which are reflected by the rear surface Q of the combiner 13A is formed slightly behind a first virtual image R of the display image which is reflected by the front surface P of the combiner 13A, it is possible to see a three-dimensional display image without making the display image indistinct due to the formation of a dual image.

Figure 6:
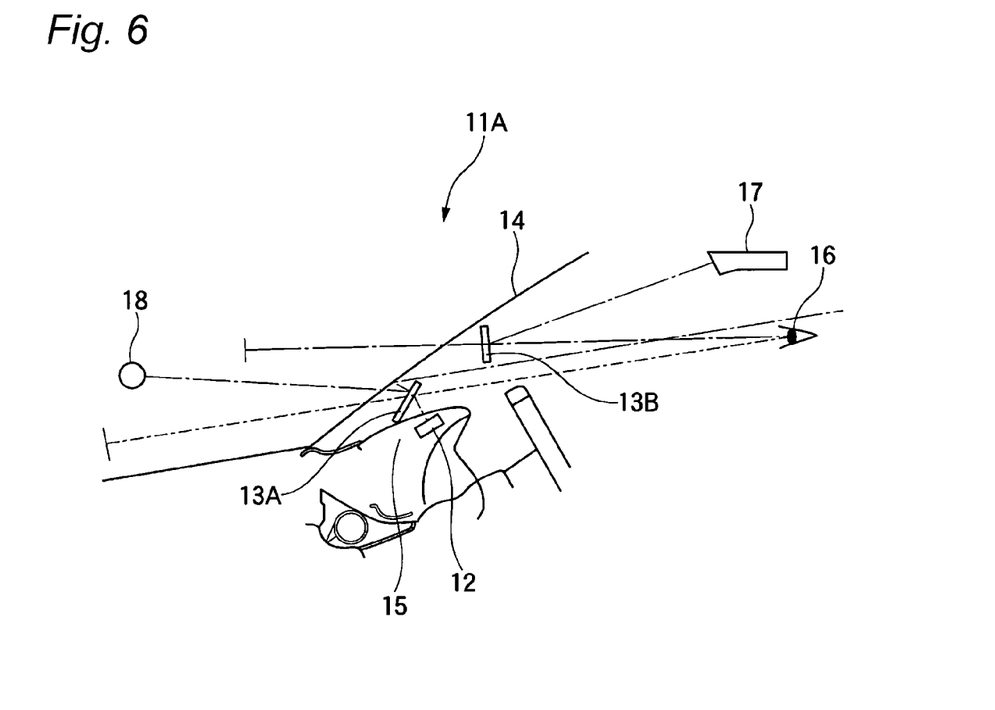
FIG. 6 is a schematic diagram showing a head-up display according to another embodiment of the invention.

FIG. 6 is a schematic diagram showing another embodiment of the head-up display 11A of the invention. In this embodiment, a combiner 13A or 13B is provided inside a windshield 14 (inward direction) to allow a driver (eye point) 16 to see a display image which is emitted from a display device 12 or emission light rays which are emitted from a projector 17 (image projector). Here, the respective combiners 13A and 13B are not brought into close contact with the windshield 14, but provided separately from the windshield 14. A display device 12 is installed inside the windshield 14 on a dashboard 15 at a predetermined gradient, and displays and emits a display image toward the combiner 13A.

The combiner 13A reflects the display image toward the driver 18 in the vehicle, and the driver 16 sees a virtual image which is formed on the outside of the windshield 14 through the reflected image. The combiner 13A is optimized by the above-described optical design so that the second virtual image of the display light rays which is seen by being reflected by a rear surface of the combiner 13A coincides with the first virtual image of the display light rays which is seen by being reflected by a front surface in terms of the size and display position. Accordingly, it is possible to avoid that the display light rays are positionally deviated from each other (dual image) and seen as in the above-described embodiments. Here, for ease of description, the windshield 14 is described as being made of a material having high transparency, a low optical refraction index and low optical reflectivity.

The combiner 13B reflects a projection image which is emitted from the projector 17 toward the driver. Due to this reflection, the driver sees the image as a virtual image which is formed outside the windshield 14. In this case, a projection image which is seen by being reflected by a rear surface of the combiner 13B is also a virtual image which is formed outside the windshield 14, and optimization by an optical design is carried out so that the virtual image coincides with a virtual image which is seen by being reflected by a front surface in terms of the size and display position. Accordingly, it is possible to avoid that the projection images are positionally deviated from each other and thus a dual image is seen.

In addition, in some cases, a light source 18 having strong light energy such as a headlight of an opposed vehicle is positioned at a position on the outside of the windshield 14 deviated from the position at which the virtual image of the display light rays is formed by the combiner 13A. In this case, light rays which pass through the windshield 14 from the light source 18 and enter the vehicle are reflected by the rear surface of the combiner 13A, and then reflected by an inner surface of the windshield 14 as shown in the drawing. When the combiner 13A is disposed to project light rays to the position deviated from the point of view (viewpoint) of the driver 16, it is possible to prevent the formation of a ghost image by the light source 18.

As described above, when display images or projection images which are emitted from the display device 12 or the projector 17 are reflected using the combiner 13A or the combiner 13B, it is possible to see these virtual images on the outside of the windshield 14 without significantly changing the line of sight. In addition, when the combiners 13A and 13B are formed on the basis of an optical design of a polynomial aspheric surface or a free-form surface such as a Zernike polynomial surface, the virtual images of the display images which are seen by being reflected by the front surfaces of the combiners 13A and 13B can be formed at a predetermined position on the outside of the windshield with a set magnification greater than one, so as not to form a dual image.

In addition, when the first virtual image of the display images or the projection images which are seen by being reflected by the front surfaces of the combiners 13A and 13B is allowed to coincide with the second virtual image which is seen by being reflected by the rear surfaces of the combiners 13A and 13B in terms of the size and position, it is possible for the driver to dearly and rapidly see a magnified high-quality display image or projection image. In this case, when the second virtual image which is seen by being reflected by the rear surfaces of the combiners 13A and 13B is formed behind the first virtual image which is seen by being reflected by the front surfaces, it is possible to give a three-dimensional effect to the display image or the projection image.

In this manner, the projection images not only from the display device 12 on the dashboard 15 but also from the projector 17 installed on a ceiling or the like of the vehicle can be reflected by the combiner 13B and seen by the driver as a virtual image magnified with a magnification greater than one. The respective combiners 13A and 13B are installed at a position separated from the windshield 14 as described above. In this case, it is also possible to clearly see the display light rays and the projection light rays with a magnification greater than one while preventing the display light rays and the projection light rays (projection image) from forming a dual image through the above-described optimization of the optical design for the combiners 13A and 13B. In addition, the combiners 13A and 13B can be subjected to the correction of a distortion of the display image and the setting of the display distance in the polynomial aspheric surface or the free-form surface such as a Zernike polynomial surface.

As described above, the head-up display 11 of this embodiment includes the display device 12 which emits display light rays and the combiner 13 which has a rear surface brought into contact with the inner surface of the windshield 14 of a vehicle, and reflects the display light rays emitted from the display device 12 by the front surface toward a driver in the vehicle, and in the combiner 13, the front surface forms the first arc-shaped optical surface P to receive the display light rays reflected toward the driver to thereby see a first virtual image R of the display information with a set magnification greater than one on the outside of the windshield 14, and the rear surface forms the second arc-shaped optical surface Q to receive the display light rays reflected toward the driver to thereby see a second virtual image S which coincides with the first virtual image R in terms of the size and position on the outside of the windshield 14.

Accordingly, the display surface of the display device 12 longer than a focal length is placed on the first optical surface P through a lens action of the combiner 13, and thus the magnification by the combiner 13 is greater than one. Therefore, the eyes of the driver see the display light rays emitted from the display device 12 as a first virtual image R, and the driver can accurately and rapidly grasp and confirm the content of the display information by looking at the magnified display light rays. Since the second optical surface Q forms a second virtual image S which coincides with the first virtual image R in terms of the size and position on the outside of the windshield 14, it is possible to avoid the formation of a dual image in advance.

In addition, since the first optical surface P and the second optical surface Q are arc-shaped optical surfaces so that the second virtual image S can be seen to be positioned behind the first virtual image R, it is possible for the eyes of the driver which see both of the virtual images R and S to recognize the display light rays (display image) as a three-dimensional image.

In addition, since the curvature of the second optical surface Q is greater than the curvature of the first optical surface P in the combiner 13, the display light rays which are reflected from the front surface and the rear surface of the combiner 13 having different curvatures can be seen as display light rays having a three-dimensional effect, while being prevented from forming a dual image.

Furthermore, since the combiner 13 is formed so that the thickness from the upper end to the lower end opposed to the upper end is thinned, it is possible to securely prevent the display light rays which are reflected by the front surface of the combiner 13 and seen by the driver and the display light rays which are reflected by the rear surface of the combiner 13 and seen by the driver from being positionally deviated from each other and from forming a dual image.

According to the head-up display according to the invention, the first optical surface virtually forms an optical surface on which a display surface of the display device longer than a focal length is placed through a lens action of the combiner, and thus the magnification by the combiner is greater than one. Therefore, the eyes of the driver see the display light rays emitted from the display device as a magnified first virtual image. Therefore, the driver can accurately and rapidly grasp and confirm the content of the display information by looking at the magnified display light rays. In addition, since the second optical surface forms a second virtual image which coincides with the first virtual image in terms of the size and position on the outside of the windshield, it is possible to avoid in advance the formation of a dual image due to a position deviation or the like between the relative positions of the first virtual image and the second virtual image.

In addition, according to the head-up display according to the invention, since the second virtual image is formed behind the first virtual image so that the positions of the first virtual image and the second virtual image are deviated from each other, the eyes of the driver which see both of the virtual images can recognize the display light rays (display image) as a three-dimensional image.

In addition, according to the head-up display according to the invention, the display light rays which are reflected toward the driver from the front surface and the rear surface of the combiner having different curvatures can be seen as display light rays having a three-dimensional effect, while being prevented from forming a dual image.

In addition, according to the head-up display according to the invention, it is possible to securely prevent the display light rays which are reflected by the front surface of the combiner and seen by the driver and the display light rays which are reflected by the rear surface of the combiner and seen by the driver from being positionally deviated from each other and from forming a dual image.

In addition, according to the head-up display according to the invention, the combiner has such a thickness shape that the display light rays which are emitted from the display device and reflected by the front surface of the combiner and the display light rays which are reflected by the outer surface of the windshield overlap each other and reach the eyes of the driver, and thus a display image which is projected by the display light rays reflected by the front surface of the combiner and a display image which is projected by the display light rays reflected by the outer surface of the windshield overlap each other without a deviation, whereby it is possible to avoid that the display image which is seen by the driver becomes a dual image.

In addition, according to the head-up display according to the invention, the driver can accurately and rapidly grasp and confirm the content of the display information by looking at the magnified display light rays. In addition, since the second optical surface forms a second virtual image which coincides with the first virtual image in terms of the size and position on the outside of the windshield, it is possible to avoid in advance the formation of a dual image due to a position deviation or the like between the relative positions of the first virtual image and the second virtual image.

According to the invention, virtual images of display images which are seen by being reflected by a front surface and a rear surface of a combiner are prevented from forming a dual image, and the display image can be clearly seen without significantly changing the line of sight movement, whereby it is possible to accurately and rapidly grasp the content of the display information.

The invention has been described in detail with reference to the particular embodiment, but it is obvious for those skilled in the art that various changes and modifications can be added without departing from the spirit and scope of the invention.

Priority is claimed on Japanese Patent Application No. 2010-204687, filed Sep. 13, 2010, the content of which is incorporated herein by way of reference.

What is claimed is:

1. A head-up display comprising:
a display device that emits display light rays; and
a combiner that has a rear surface configured to be brought into contact with an inner surface of a windshield of a vehicle, and reflects the display light rays emitted from the display device by a front surface of the combiner toward a driver in the vehicle, the front surface being positioned outside of the windshield of the vehicle if the rear surface of the combiner is brought into contact with the inner surface of the windshield,
wherein the front surface of the combiner forms a first arc-shaped optical surface which receives and reflects the display light rays emitted from the display device toward the driver so that the driver sees a first virtual image of the display light rays with a set magnification greater than 1 on the outside of the windshield, and the rear surface forms a second arc-shaped optical surface which receives and reflects the display light rays emitted from the display device toward the driver so that the driver sees a second virtual image which coincides with the first virtual image in terms of the size and position on an outside of the windshield.

2. The head-up display according to claim 1, wherein the first optical surface and the second optical surface are arc-shaped optical surfaces so that the second virtual image is seen to be positioned behind the first virtual image.

3. The head-up display according to claim 1, wherein a curvature of the second optical surface of the combiner is greater than a curvature of the first optical surface of the combiner.

4. The head-up display according to claim 1, wherein a thickness of the combiner becomes thinner from one end to the other end.

5. The head-up display according to claim 1, wherein the inner surface of the windshield is exposed to an interior of the vehicle.

6. The head-up display according to claim 1, wherein the combiner and the windshield constitute separate and discrete elements.

7. A head-up display comprising:
a display device that emits display light rays; and
a combiner that has a rear surface brought into contact with an inner surface of a windshield of a vehicle, and reflects the display light rays emitted from the display device by a front surface of the combiner toward a driver in the vehicle,
wherein the combiner has a cross-section formed into a wedge shape, a thickness of the cross-section continuously becomes thinner from one end to the other end, the inner surface of the windshield is exposed to an interior of the vehicle, and the combiner and the windshield constitute separate elements.

8. The head-up display according to claim 7, wherein the cross-section formed into a wedge shape is taken along a plane that is substantially perpendicular to the windshield, and the rear surface of the combiner has a convex shape and the front surface of the combiner has a concave shape.

9. A head-up display comprising:
a display device that emits display light rays; and
a combiner that is disposed separately from an inner surface of a windshield of a vehicle, and reflects the display light rays emitted from the display device by a front surface of the combiner toward a driver in the vehicle,
wherein the front surface of the combiner forms a first arc-shaped optical surface to receive and reflect the display light rays emitted from the display device toward the driver so that the driver sees a first virtual image of the display light rays with a set magnification greater than 1 on an outside of the windshield, and the rear surface of the combiner forms a second arc-shaped optical surface to receive and reflect the display light rays emitted from the display device toward the driver so that the driver sees a second virtual image which coincides with the first virtual image in terms of the size and position on the outside of the windshield.

10. The head-up display according to claim 9, wherein the combiner is spaced from all portions of the windshield.

11. The head-up display according to claim 9, wherein the combiner and the windshield constitute separate and discrete elements.

* * * * *